United States Patent Office 3,511,698
Patented May 12, 1970

3,511,698
WEATHERABLE ELECTRICAL INSULATORS MADE OF THERMOSETTING RESIN
Thomas D. Talcott, Midland, Mich., assignor to Dow Corning Corporation, Midland, Mich., a corporation of Michigan
No Drawing. Continuation-in-part of application Ser. No. 559,752, June 23, 1966. This application Oct. 26, 1966, Ser. No. 589,487
Int. Cl. B32b *25/20;* B44d *1/40*
U.S. Cl. 117—138.8                    6 Claims

ABSTRACT OF THE DISCLOSURE

This invention concerns the use of silicone elastomers which cure by the addition of SiH groups to SiCH=$CH_2$ or SiCH$_2$CH=$CH_2$ groups under the influence of a platinum catalyst, as coatings on thermosetting organic resin electrical insulators.

---

This application is a contiuation-in-part of applicant's copending application Ser. No. 559,752, filed June 23, 1966, and now abandoned, bearing the same title as this application.

This application relates to the process of preparing an insulator comprising (1) applying to the surface of a rigid, cured thermosetting resin base member, a dispersion of an inert liquid of a silicone elastomer stock which comprises an organopolysiloxane gum consisting essentially of units selected from the group consisting of dimethylsiloxane and 3,3,3-trifluoropropylmethylsiloxane, said base polymer containing a plurality of at least one type of the following functional groups, SiH groups and Si alkenyl groups and said elastomer stock containing both SiH and Si alkenyl functional groups, said alkenyl groups being of the group consisting of vinyl and allyl, and which elastomer stock contains at least 0.0001 weight percent of platinum, and (2) evaporating said volatile liquid and curing said elastomer stock, whereby a nontacky, organo-polysiloxane elastomer coating which is at least ten mils thick is formed on said insulator.

Modern electrical technology, particularly the field of high voltage power transmission, is presently demanding insulators of increasingly large size, up to several feet in diameter.

There appears to be an upper limit on the size of porcelain and glass insulators which can be economically fabricated without cracking on cooling, and the size of some required insulators is currently approaching or exceeding that limit.

Operative insulators can also be fabricated from thermosetting resins, particularly those which are reinforced with such materials as fibrous glass or powdered silica. There are fewer difficulties in preparing large insulators from these materials, but they exhibit poor weatherability upon prolonged exposure to the outdoors and poor "track resistance," i.e. resistance to repeated flashover of current along the same path on the surface of the resistor.

Insulators made by the process of this invention combine the advantages of porcelain insulators with thermosetting resin insulators. They can be fabricated to any size or shape, yet they exhibit superior weatherability and track resistance because of the silicone elastomer coating. The track resistance of the insulators of this invention is superior even to resistors which are made of silicone resin. Less expensive resins can be used to prepare the base members used herein, so a considerable savings in cost as well as an improvement in performance can be attained through the use of the resistors of this invention.

The silicone elastomer coatings which are used herein can have the high strength of peroxide-cured silicone elastomers, yet they are nontacky when air-cured, in distinction from peroxide-cured elastomers. The track resistance of the silicone elastomer coatings used herein therefore superior to other silicone elastomer coatings as the coatings used herein pick up less dust and dirt. Furthermore, no post-cure heating is required with the elastomers used herein.

The elastomer coatings used in this invention also have the added advantage of being inherently self-extinguishing to fire, and they frequently have arc resistance which is superior to silicone elastomers which are cured by the crosslinking of silicon-bonded hydrolyzable and hydroxyl groups.

Any thermosetting resin which cured to a rigid base member is operative herein: e.g. epoxy resins such as the reaction product of bis-phenol A and epichlorohydrin; alkyd resins such as glycerol terephthalate, or a terpolymer of pentaerythriol, ethylene glycol, and adipic acid; phenolic resins such as poly(phenol-formaldehyde); melamine resins; hydrocarbon resins such as peroxide-cured poly(styrene-butadiene); and silicone resins.

Generally silicone resins are not preferred because of their expense, unless the insulator is intended to encounter extremely high temperatures. Epoxy resins and phenolic resins give excellent results.

The base member usually contains a filler as well as a thermosetting resin, e.g. fibrous glass such as glass cloth, yarn, or chopped roving; powdered glass, silica quartz, mica, alumina, or stone; or asbestos, rayon fibers, or any other insulator which can physically reinforce the resin. The base member can be a laminate, a composite, or a filament-wound composite.

The organopolysiloxane elastomer stock can be dispersed in any inert, volatile liquid, e.g. water, heptane, cyclohexane, toluene, xylene, benzene, methylisobutylketone, ethyl acetate, dibutylether, cyclohexanone, ethyleneglycoldimethylether, chlorobenzene, 1,1,1-trichloroethane, 1,1,2-trifluoro-1,2,2-trichloroethane, and chloroform. The term "inert" means that the liquid is not chemically reactive with the elastomer stock or the base member to a significant degree.

The dispersion used generally contains from 20 to 50 weight percent of the elastomer stock; any concentration can be used so long as the required 10 mil coating is obtained by one or more applications of the dispersion on the base member.

The dispersion can be applied to the base member in any manner desired: dipping, brushing, spraying, etc., and the elastomer coating can be made as thick as desired by as many applications of the dispersion as is needed.

For the sake of economy, the elastomer coating is usually from 20 to 40 mils thick. This is entirely adequate in most cases to provide the advantages stated above.

The elastomer stock used is preferably curable to form an elastomer having a die B tear strength of at least 100 p.s.i. (measured by A.S.T.M. Test D–624) and a tensile strength of at least 800 p.s.i. (measured by A.S.T.M. Test D–412). By this it is not meant that the elastomer coating on the base member must have these strengths, for it would be difficult to ascertain whether or not a given coating fulfilled this requirement. The requirement instead refers to a sample of the bulk elastomer stock which is cured at the same temperature as the given coating on a base member. In this manner it is easy to ascertain whether or not a given elastomer stock is preferable for use in this invention. Without the preferred tear and tensile strengths, the elastomer coating will be easily abraded and rubbed off of the surface of the base member.

The curable elastomer stocks used herein can be prepared in a number of known ways. U.S. Patents 2,823,218;

3,159,601; 3,188,299; and 3,192,181, for example, teach the preparation of elastomers of the class which are usable herein, although some of the formulations shown will be improved by obvious modifications such as the inclusion of a filler or the alteration of the crosslink density in order to exhibit sufficient strength to make a good coating. Other operative formulations are shown in the examples below.

The silicone elastomer stock is based on a polymer consisting essentially of $(CH_3)_2SiO$ units and/or

units, although it is required that small numbers of siloxane units which contain $\equiv SiH$ or $\equiv SiCH=CH_2$ or $\equiv SiCH_2CH=CH_2$ bonds also be present in the polymer. The term consisting essentially of means that the base polymer can contain other siloxane units such as $$(C_6H_5)_2SiO$$

or $C_6H_5(CH_3)SiO$ in minor amounts. It should be understood that the base polymer must contain SiH functional groups or silicon alkenyl functional groups or both. However, as shown in the examples below only one type of functional group need be in the base polymer and the other type can be in a separate siloxane which is commonly called the crosslinking agent.

The crosslinking agents used herein are organosiloxanes which contain one or more of the above functional groups. Besides those shown in the examples infra, the crosslinking agents can be, for example, $C_6H_5Si[OSi(CH_3)_2H]_3$, $[(CH_3)HSiO]_4$,

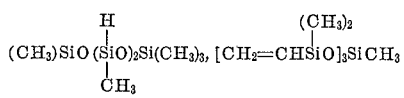

or any other organosilicon compound having SiH, $SiCH=CH_2$ or $SiCH_2CH=CH_2$ groups. The molecular weight and molecular configuration of the crosslinking agent is not critical. Thus one can use crosslinking agents ranging in scope from thin fluids to high molecular weight gums. Of course, no crosslinking agent is needed when the base polymer contains both SiH and Si alkenyl groups.

In addition to the base polymer and, if needed, a crosslinking agent, the silicone elastomer stock must also contain a platinum catalyst. The platinum catalyst used herein can be in any known form, i.e. chloroplatinic acid, platinum deposited on charcoal or alumina or other substrate, platinum-olefin complexes, platinum complexed with alkenyl substituted silicones or other platinum complexes or salts.

The elastomer stock can also contain other additives such as fillers, plasticizers, stabilizers and other materials used with silicone elastomers.

Both heat curable and room temperature vulcanizing elastomer stocks are usable in this invention. The elastomer stock will normally cure at room temperature after removal of the dispersing liquid unless an inhibitor is used. It is best for a cure inhibitor to be present in the elastomer stock used. Examples of such inhibited stocks are shown in the application of Kookootsedes and Plueddemann, Ser. No. 559,729, filed June 23, 1966, assigned to the same assignee as the present application, and now U.S. Patent 3,445,420, and in U.S. Patent 3,159,601.

It is also desirable for the elastomer stock to contain from 5 to 15 weight percent of hydrated aluminum oxide to improve the track resistance.

The elastomer stock used herein can be dispersed in the volatile liquid by known mechanical means.

The insulators of this invention can be used as transformer or circuit breaker bushings, arrestor bodies, suspension insulators, standoff insulators, bus bar insulators, cable hangers, and "hot line" tool handles, as well as any other substitute for a porcelain insulator, especially where the insulator is of large size and difficult to fabricate out of porcelain.

It is preferred for the silicone elastomer coating to cover the entire surface of the base member in order to obtain the maximum weatherability and track resistance.

Adhesion problems of the silicone elastomer to the base member are not frequently encountered, but if desired, the base member can be primed, such as in the manner taught in British Patent 961,235, before application of the dispersion of elastomer stock.

If the elastomer coating is rubbed or torn away at any spot on an insulator of this invention, it can be easily replaced by reapplication of a dispersion of an elastomer stock usable herein, followed by evaporation of the dispersing agent and curing. For added convenience, room temperature vulcanizing elastomer stocks can be used.

The following examples are illustrative only and should not be construed as limiting the invention, which is properly delineated in the appended claims.

EXAMPLE 1

A mixture was made of 100 parts by weight of a dimethylvinylsiloxane-endblocked dimethylpolysiloxane gum containing 0.142 mol percent of methylvinylsiloxane units, 55 parts of powdered silica having a surface area of 200 m.²/g., 8 parts of a hydroxylated dimethylpolysiloxane fluid, 5 parts of diphenylsilane diol, and 1 part of a methylvinylpolysiloxane fluid.

This mixture was heated for 3 hours at 177° C.

To 100 parts by weight of the above mixture there was added 10 parts of trihydrated aluminum oxide, 1.5 parts of a fluid polymer of 19 mol percent of

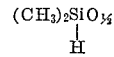

units, 1 mol percent of $(CH_3)_3SiO_{1/2}$ units, 49 mol percent of $(CH_3)_2SiO$ units, and 31 mol percent of

units, 1 part of a reaction product of chloroplatinic acid and a vinylated phenylmethylorganopolysiloxane (about 0.003 part by weight platinum), 0.25 part of 2-ethynyl-isopropanol as a stabilizer

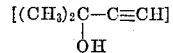

and 4 parts of color additive. A 30 weight percent dispersion of the resulting elastomer stock was made in xylene.

A sample of the above elastomer stock was cured at 100° C. It had a die B tear strength of 190 p.s.i., a tensile strength of 1250 p.s.i., and was self-extinguishing when placed in a flame and then removed.

A rod made of a composite of chopped glass fibers and the amine-cured reaction product of bis-phenol A and epichlorohydrin (a commercial epoxy resin) was dipped in the above dispersion, allowed to dry, and cured at 100° C. to form a tough, nontacky elastomeric coating of about 25 mils thickness over the rod.

Two electrodes were placed ¼ inch apart on the surface of the elastomer coating in order to test the track resistance in accordance with ASTM Test D495–61, using a potential of 15,000 volts.

The potential was maintained between the electrodes for more than 482 seconds without the formation of a continuous arc on a single electrical track between the electrodes. The coated bar also exhibited excellent weatherability and strength.

The above track resistance test was repeated on an uncoated epoxy resin-glass fiber bar similar to the one above. A continuous electrical track formed in about 55 seconds.

The above track resistance test was repeated on a similar epoxy resin-glass fiber bar which had been coated with the reaction product of glycerol terephthalate and a phenylmethylsiloxane resin and cured. This material applied was a commercial silicone-alkyd electrical varnish. A continuous electrical track formed in about 20 seconds.

The above track resistance test was repeated on a similar epoxy resin-glass fiber bar which had been coated with an organopolysiloxane resin of the average unit formula

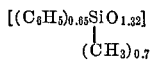

and cured. A continuous electrical track formed in about 145 seconds. Coatings made of similar silicone resins gave poorer results.

EXAMPLE 2

Equivalent results are obtained when the procedure of Example 1 is applied to large epoxy resin-glass fiber transformer bushings and to large poly(phenol-formaldehyde) resin-glass fiber arrestor bodies for high voltage circuits, the elastomer dispersion being sprayed onto the base members until an elastomer thickness of 40 mils is attained after cure

EXAMPLE 3

When an elastomer stock is formulated from the following ingredients, application of the elastomer stock as a 20 weight percent dispersion in chlorothene to suspension insulators made of poly(ethylene glycol-glycerol-terephthalic acid) and reinforced with glass fabric yields, after curing the silicone coating for one hour at 120° C. to form a 30 mil coating, a weatherable resistor having a nontacky, track-resistant, silicone elastomer coating:

(a) 100 parts by weight of

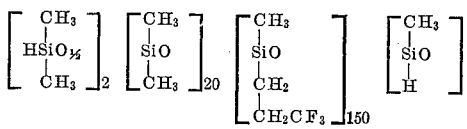

(b) 40 parts of finely powdered silica which has been rendered hydrophobic by treatment with 8 parts of

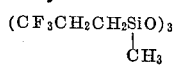

in the presence of ammonia, (c) 2 part of

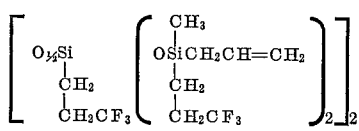

(d) 0.1 part of the reaction product of 1 g. of chloroplatinic acid and 10 g. of

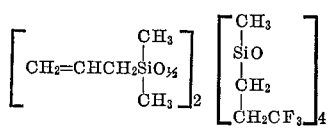

and (e) 0.5 part of benzotriazole.

That which is claimed is:

1. The process of preparing an insulator comprising
(1) applying to the surface of a rigid, cured thermosetting resin base member a dispersion in a volatile inert liquid, of a silicone elastomer stock which is based on an organopolysiloxane gum consisting essentially of units selected from the group consisting of dimethylsiloxane and 3,3,3-trifluoropropylmethylsiloxane, said organopolysiloxane gum containing a plurality of at least one type of the following functional groups, SiH groups and Si alkenyl groups and said elastomer stock containing both SiH groups and Si alkenyl groups, said alkenyl groups being of the group consisting of vinyl and allyl, and which elastomer stock contains at least 0.0001 weight percent of platinum, and
(2) evaporating said volatile liquid and curing said elastomer stock, whereby a nontacky, organopolysiloxane elastomer coating which is at least ten mils thick is formed on said insulator.

2. An insulator comprising a rigid, cured thermosetting resin base member and a coating over the surface of said base member of at least ten mils thickness of cured, organopolysiloxane elastomer which comprises in the uncured state a silicone elastomer stock which is based on an organopolysiloxane gum consisting essentially of units selected from the group consisting of dimethylsiloxane and 3,3,3-trifluoropropylmethylsiloxane, said organopolysiloxane gum containing a plurality of at least one type of the following functional groups, SiH groups and Si alkenyl groups and said elastomer stock containing both SiH groups and Si alkenyl groups, said alkenyl groups being of the group consisting of vinyl and allyl, and which elastomer stock contains at least 0.0001 weight percent of platinum.

3. The insulator of claim 2 where said base member consists essentially of a composite of thermosetting resin and glass fiber.

4. The insulator of claim 2 where said cured, organopolysiloxane elastomer contains from 5 to 15 weight percent of hydrated aluminum oxide.

5. The insulator of claim 2 where said cured, organopolysiloxane elastomer consists essentially of dimethylsiloxane units.

6. The insulator of claim 2 where said elastomer is cured by the reaction of $\equiv$SiH groups with $\equiv$SiCH=CH$_2$ groups.

References Cited

UNITED STATES PATENTS

| | | | |
|---|---|---|---|
| 2,442,196 | 5/1948 | Coggeshall | 117—161 X |
| 2,725,312 | 11/1955 | Schell | 117—75 X |
| 2,816,348 | 12/1957 | Adamik | 117—126 X |
| 3,020,260 | 2/1962 | Nelson | 117—161 X |
| 3,206,330 | 9/1965 | Chottiner | 117—75 X |
| 2,823,218 | 2/1958 | Speier et al. | 260—85.1 |
| 3,159,601 | 12/1964 | Ashby | 260—448.2 |
| 3,192,181 | 6/1965 | Moore | 260—448.2 |

WILLIAM D. MARTIN, Primary Examiner

D. COHEN, Assistant Examiner

U.S. Cl. X.R.

117—126, 161